C. R. DONNER.
Horseshoeing-Tool.
No. 166,971.  Patented Aug. 24, 1875.
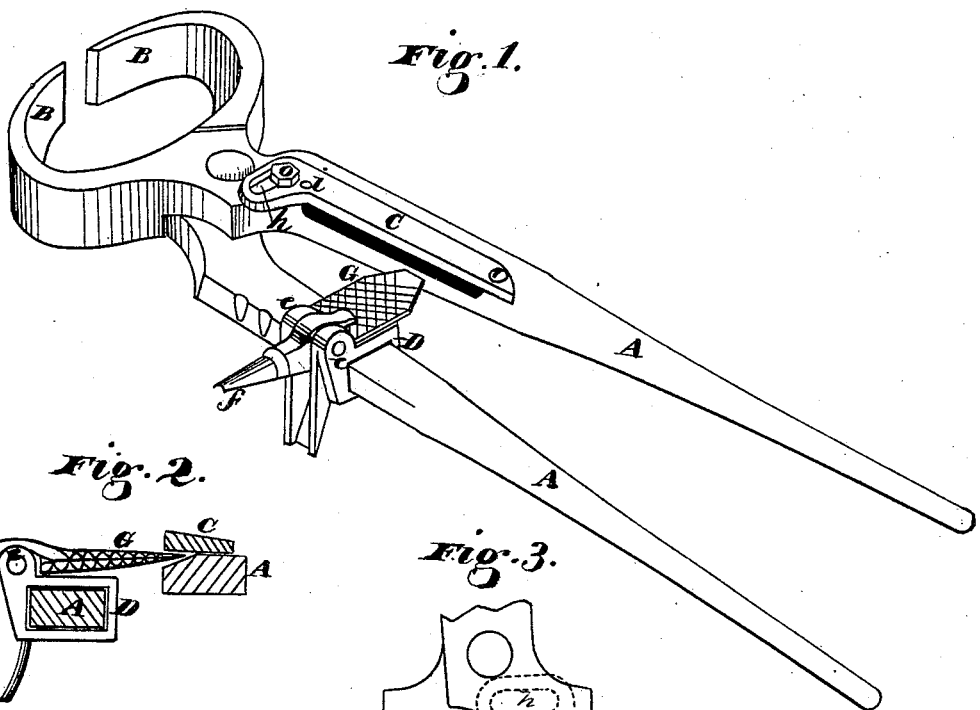
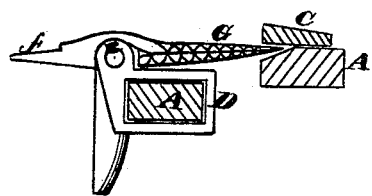
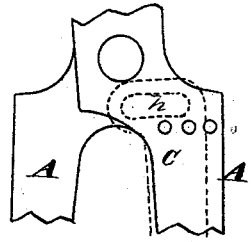
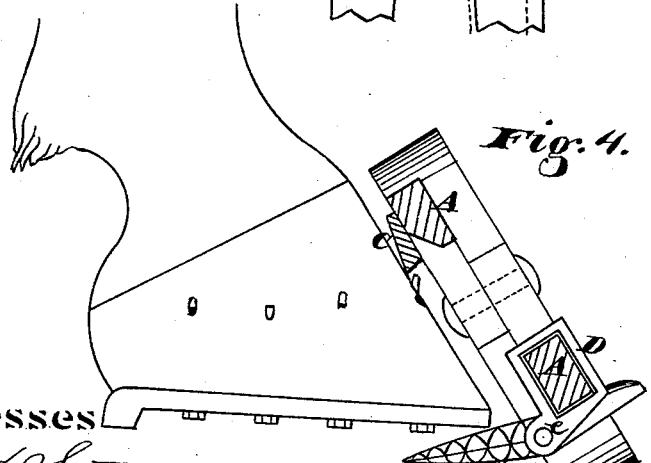
Witnesses  
Geo. H. Strong  
Jno. L. Boone  
Inventor  
Carl. R. Donner  
by Dewey & Co  
Attys

UNITED STATES PATENT OFFICE.

CARLS R. DONNER, OF SAN FRANCISCO, CALIFORNIA.

IMPROVEMENT IN HORSESHOEING-TOOLS.

Specification forming part of Letters Patent No. 166,971, dated August 24, 1875; application filed June 22, 1875.

*To all whom it may concern:*

Be it known that I, CARLS R. DONNER, of San Francisco city and county, State of California, have invented a Method of Grooving Hoofs and Clinching Horseshoe-Nails; and I do hereby declare the following description and accompanying drawings are sufficient to enable any person skilled in the art or science to which it most nearly appertains to make and use my said invention without further invention or experiment.

My invention relates to a novel method and device for grooving hoofs or fitting for the ends of nails, which project through the hoof of a horse after fastening the shoe, so that it will not be necessary to use a file, as is ordinarily done, and the grooving or the marring of the hoof is thus avoided. My invention also contemplates, in this connection, a novel mechanism by which, after the grooving is completed, the nail may be folded down into its groove, and thus clinched without the use of a hammer.

Referring to the accompanying drawings for a more complete explanation of my invention, Figure 1 is a perspective view of my invention. Fig. 2 is a transverse section across the handles. Fig. 3 shows the manner of adjusting the plates C. Fig. 4 shows the manner of clinching the nails.

A A are the handles, and B B the jaws, of a pair of blacksmith's forceps. Upon one of the handles A, near the joint, I fix a steel plate, C, as shown, one end being slotted transversely, so that the plate can be moved in or out, for a purpose hereafter described. A sliding socket, D, is fitted to be placed upon the other handle A, and between the two lugs e e the graver f and the flattened corrugated or roughened plate G (formed in one piece) are hinged. The graver is a scoop-shaped chisel, made sharp at its end, and when the nippers are closed this graver projects from one side of the handle, and is retained in that position by allowing the end of the plate G to enter a slot between the plate C and the handle A, and this holds the graver steadily, as shown in Fig. 2, while the nippers are grasped by both hands, and the grooves cut in the hoof below the point where the nails come through. The grooves being all cut, the handles are opened and the plate G turned outward upon its pivot, and this carries the graver into a slot in the socket D, between the sides of which it lies. Notches are cut in the handle A, and the edges of the graver lie in these notches, thus holding the socket and preventing it from sliding upon the handle during the operation of clinching the nails. This operation is performed by simply opening the handles and placing the roughened plate G beneath the hoof, as shown in Fig. 4. The edge of the steel plate C is then placed above the projecting point of the nail, and by closing the handles the nail will be bent down into its groove, where it lies nearly flush with the hoof, and needs but little finishing with the rasp. The transverse slot $h$, before mentioned, has a screw, $o$, passing through it, and by loosening this screw the plate may be lifted up a little, and the short pin $i$, which projects below it, may be allowed to drop into either of the holes made in the handle for its reception, after which the screw $o$ may be tightened. This arrangement allows the plate C to be adjusted to fit it to large or small hoofs.

Having thus described my invention, what I claim, and desire to secure by Letters Patent, is—

1. The scoop-shaped graver $f$, adjustably fitted to the handles of a forceps, for the purpose of channeling the hoofs, substantially as and for the purpose described.

2. The laterally-adjustable plate G and vertically-adjustable plate C, in combination with the handle of the nippers B, substantially as and for the purpose set forth.

In witness whereof I hereunto set my hand and seal.

CARLS R. DONNER. [L. S.]

Witnesses:
 GEO. H. STRONG,
 JNO. L. BOONE.